United States Patent
Jaramillo et al.

(10) Patent No.: US 12,386,776 B2
(45) Date of Patent: Aug. 12, 2025

(54) ENHANCED SERIAL PERIPHERAL INTERFACE

(71) Applicant: NXP USA, Inc., Austin, TX (US)

(72) Inventors: Kenneth Jaramillo, Gilbert, AZ (US); Sharad Murari, Gilbert, AZ (US); Ajay Kumar Reddy Gaddam Mupkal, Chandler, AZ (US); Sundarapandian Andi Thevar, Chandler, AZ (US)

(73) Assignee: NXP USA, Inc., Austin, TX (US)

( * ) Notice: Subject to any disclaimer, the term of this patent is extended or adjusted under 35 U.S.C. 154(b) by 164 days.

(21) Appl. No.: 18/298,052

(22) Filed: Apr. 10, 2023

(65) Prior Publication Data

US 2024/0338337 A1 Oct. 10, 2024

(51) Int. Cl.
G06F 13/42 (2006.01)
G06F 1/06 (2006.01)

(52) U.S. Cl.
CPC ............ G06F 13/4291 (2013.01); G06F 1/06 (2013.01)

(58) Field of Classification Search
CPC .............................. G06F 13/4291; G06F 1/06
USPC .................. 710/3, 5, 15, 21, 46, 61, 105
See application file for complete search history.

(56) References Cited

U.S. PATENT DOCUMENTS

| | | | |
|---|---|---|---|
| 4,689,740 A | 8/1987 | Moelands | |
| 5,745,772 A * | 4/1998 | Klein | G06F 13/24 710/266 |
| 6,182,112 B1 * | 1/2001 | Malek | G06F 12/0813 709/201 |
| 7,308,516 B2 | 12/2007 | Dressen | |
| 8,755,309 B2 * | 6/2014 | Krzyzanowski | G06F 15/16 370/257 |
| 9,743,159 B2 * | 8/2017 | Hsieh | H04Q 9/00 |
| 11,609,877 B1 | 3/2023 | Haidar et al. | |
| 2005/0091427 A1 * | 4/2005 | Yoshida | G06F 13/4286 710/48 |
| 2006/0020733 A1 * | 1/2006 | Sarda | G06F 13/4291 710/305 |
| 2018/0309542 A1 * | 10/2018 | Austin | H04L 1/14 |
| 2019/0238362 A1 | 8/2019 | Mishra et al. | |
| 2023/0032989 A1 | 2/2023 | Barrenscheen | |

OTHER PUBLICATIONS

UM10204 "IC-Bus Specification and User Manual", Rev. 6, NXP Semiconducors, Apr. 4, 2014, pp. 1-64.

(Continued)

Primary Examiner — Idriss N Alrobaye
Assistant Examiner — Henry W Yu (57) ABSTRACT

A bus system, including a clock line, a first data line, and a second data line. The bus system further includes an initiator connected to a first end of the clock line, the first data line, and the second data line. The initiator sends a start indication on the clock line and the first data line, sends command bits followed by address bits on the first data line, and sends a stop indication on the clock line and the first data line. The bus system also includes a target connected to a second end of the clock line, the first data line, and the second data line. The target sends target acknowledge information followed by target interrupt information on the second line while the command bits and address bits are sent.

25 Claims, 8 Drawing Sheets

(56) References Cited

OTHER PUBLICATIONS

Radha Krishna Atukula, et al., "MIPI Alliance Specification for System Power Management Interface (SPMI)," Version 2.0, Mar. 14, 2012 pp. 1-91.
"MIPI Alliance Errata 01 for MIPI I3C Specification (Improved Inter Integrated Circuit)," Version 1.1.1, Jun. 11, 2021, pp. 1-572.
Motorola, Inc. "SPI Block Guide," Version 04.01, Jan. 21, 2000, document No. S12SPIV4/D, pp. 1-40.
"System Management Bus (SMBus) Specification," Version 3.2, Jan. 12, 2022, pp. 1-86.
Freescale Semiconductor, Inc, "SPI Block Guide," V04.01, Document No. S12SPIV4/D, Jan. 21, 2000, Revised: Jul. 14, 2004, 40 pages.
MIPI Alliance, Inc., "Universal Serial Bus, I3C® Device Class Specification," Version 1.1, Jan. 2023, 90 pages.
SMI, "System Management Bus (SMBus), Specification," Version 3.2, Jan. 12, 2022, 86 pages.
Intel, "Enhanced Serial Peripheral Interface (eSPI) Interface Base Specification (for Client and Server Platforms)"; Revision 1.0; Jan. 2016; 130 pages.

\* cited by examiner

ENHANCED SERIAL PERIPHERAL INTERFACE

FIELD OF THE DISCLOSURE

Various exemplary embodiments disclosed herein relate to an enhanced serial peripheral interface (ESPI) optimizing pin count and bandwidth including target feedback mechanism.

BACKGROUND

There are many standard serial bus protocols (serial peripheral interface (SPI), inter integrated circuit (I2C), system management bus (SMBUS), system power management interface (SPMI), I3C, etc.) that each have their advantages and disadvantages. SPI, I2C, and SMBUS are older protocols that still remain very popular. SPMI and I3C are newer higher speed protocols that have many more features than SPI, I2C, and SMBUS. SPMI and I3C are both gaining in popularity.

Some systems, however, need more bandwidth than I2C and SMBUS can provide and more functionality than SPI can provide. These systems may also not require the complexity of the I3C and SPMI protocols. I3C and SPMI offer a lot of good features, but these may not be needed by some designs, and the added design complexity may impact the limited design resources of the design team.

SUMMARY

A summary of various exemplary embodiments is presented below.

Various embodiments relate to a method of communicating over a bus with a clock line, first data line, and second data line between an initiator and a target, including: sending, by the initiator, a start indication on the clock line and the first data line; sending, by the initiator, command bits followed by address bits on the first data line; sending, by the target, target acknowledge information followed by target interrupt information on the second data line while the command bits and address bits are sent; and sending, by the initiator, a stop indication on the clock line and the first data line.

Various embodiments are described, further including: sending, by the initiator, write data to the target on the first data line and the second data line when the command bits indicate a write operation; performing a first bus turnaround on the first data line to allow the target to transmit on the bus; sending, by the target, an acknowledge/not acknowledge bit on the first data line; and performing a second bus turnaround on the first data line to allow the initiator to transmit on the bus.

Various embodiments are described, further including: sending, by the initiator, additional write data to the target on the first data line and the second data line when the previous acknowledge/not acknowledge bit indicates an acknowledgement.

Various embodiments are described, wherein the target starts driving the first data line on a falling edge of a clock signal on the clock line during the first bus turnaround.

Various embodiments are described, further including: starting, by the target, a watchdog timer when the start indication is sent; and resetting the target to an idle mode when the watchdog timer expires, wherein the watchdog timer is stopped when the stop indication is sent.

Various embodiments are described, further including: performing a first bus turnaround on the first data line to allow the target to transmit on the bus when the command bits indicate a read operation; sending, by the target, read data to the initiator on the first data line and the second data line when the command bits indicate a read operation; sending, by the target, an acknowledge/not acknowledge bit on the first data line; performing a second bus turnaround on the first data line to allow the initiator to transmit on the bus; and performing a third bus turnaround on the first data line to allow the target to transmit on the bus.

Various embodiments are described, further including: sending, by the target, additional read data to the initiator on the first data line and the second data line when the previous acknowledge/not acknowledge bit indicates an acknowledgement.

Various embodiments are described, wherein the target starts driving the first data line on a falling edge of a clock signal on the clock line during the first bus turnaround.

Various embodiments are described, wherein the start indication includes a high signal for three clock cycles on the clock line and a high signal for a second clock cycle of the three clock cycles on the first data line.

Various embodiments are described, wherein the start indication includes a high signal for a first number of clock cycles on the clock line and a high signal for a second number of clock cycles on the first data line, wherein the first number is greater than the second number.

Various embodiments are described, wherein the stop indication includes a low signal for three clock cycles on the clock line and a high signal for a second clock cycle of the three clock cycles on the first data line.

Various embodiments are described, wherein the stop indication includes a low signal for a first number of clock cycles on the clock line and a high signal for a second number of clock cycles on the first data line, wherein the first number is greater than the second number.

Various embodiments are described, further including: sending by the target a target bus request before sending, by the initiator, a start indication on the clock line and the first data line.

Various embodiments are described, wherein data is driven on the first line and the second line by the rising edge of a clock signal on the clock line and captured on the falling edge of the clock signal.

Further various embodiments relate to a bus system, including: a clock line; a first data line; a second data line; an initiator connected to a first end of the clock line, the first data line, and the second data line, wherein the initiator is configured to: send a start indication on the clock line and the first data line; send command bits followed by address bits on the first data line; and send a stop indication on the clock line and the first data line; and a target connected to a second end of the clock line, the first data line, and the second data line, wherein the target is configured to: send target acknowledge information followed by target interrupt information on the second data line while the command bits and address bits are sent.

Various embodiments are described, wherein the initiator is further configured to: send write data to the target on the first data line and the second data line when the command bits indicate a write operation; and perform a first bus turnaround on the first data line to allow the target to transmit on the bus system; and the target is further configured to: send an acknowledge/not acknowledge bit on the first data line; and perform a second bus turnaround on the first data line to allow the initiator to transmit on the bus system.

Various embodiments are described, wherein the initiator is further configured to send additional write data to the target on the first data line and the second data line when the acknowledge/not acknowledge bit indicates an acknowledgement.

Various embodiments are described, wherein the target is further configured to start driving the first data line on a falling edge of a clock signal on the clock line during the first bus turnaround.

Various embodiments are described, wherein the target is further configured to: start a watchdog timer when the start indication is sent; and reset the target to an idle mode when the watchdog timer expires, wherein the watchdog timer is stopped when the stop indication is sent.

Various embodiments are described, wherein the initiator is further configured to: perform a first bus turnaround on the first data line to allow the target to transmit on the bus system when the command bits indicate a read operation; and perform a third bus turnaround on the first data line to allow the target to transmit on the bus system after the second bus turnaround; the target is further configured to: send read data to the initiator on the first data line and the second data line when the command bits indicate a read operation; send an acknowledge/not acknowledge bit on the first data line; and perform a second bus turnaround on the first data line to allow the initiator to transmit on the bus system.

Various embodiments are described, wherein the target is further configured to send additional read data to the initiator on the first data line and the second data line when the acknowledge/not acknowledge bit indicates an acknowledgement.

Various embodiments are described, wherein the target starts driving the first data line on a falling edge of a clock signal on the clock line during the first bus turnaround.

Various embodiments are described, wherein the start indication includes a high signal for three clock cycles on the clock line and a high signal for a second clock cycle of the three clock cycles on the first data line.

Various embodiments are described, wherein the stop indication includes a low signal for three clock cycles on the clock line and a high signal for a second clock cycle of the three clock cycles on the first data line.

Various embodiments are described, where the target is further configured to send a target bus request before sending, by the initiator, a start indication on the clock line and the first data line.

Various embodiments are described, wherein the first line and the second line have first pull down resistors at the initiator and the first and second lines have second pull down resistors at the target.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of enhanced serial peripheral interface systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Many systems need a simple serial bus providing moderate bandwidth which interfaces like I2C and SMBUS cannot provide, but they also need features which SPI cannot provide such as byte level target feedback acknowledge/not acknowledge (ACK/NAK). And even though I3C and SPMI provide much more bandwidth than I2C and SMBUS, they are complex protocols that may not be desired due to their complexity. These are complex protocols for a design team to implement and verify, especially for systems which do not require that functionality. This is especially true for simple point to point buses with one target and one initiator.

Many systems use serial buses to allow a processing system to communicate with another device containing peripheral devices with registers and FIFOs. Many times these FIFOs are 8 bit byte based but add a bit or 2 to the FIFOs to convey control information. For example, a Tx FIFO may use the 9th bit in the FIFO to convey control versus data. For control bytes, they may convey information such as start of packet, end of packet, USB PD start of packet type (SOP', SOP", etc.). For systems like this, it would be beneficial to have the serial protocol only send the number of bits required. For example, I3C and SPMI would need to send two 8 bit bytes (plus the parity bits they have for each byte) to access each FIFO entry. If the serial interface could only send 9 bits for each byte, then it would eliminate the need to send extra unused bits.

Low pin count is a desired feature for serial buses. I2C, SMBUS, I3C, and SPMI only require 2 pins providing very efficient pin usage. Single SPI target connections typically require at least 4 pins (SCS, SCLK, MOSI, MISO) but including an interrupt adds a 5th pin. An enhanced serial peripheral interface (ESPI) bus disclosed herein uses 3 pins (SCLK, SDATA0, SDATA1). This is higher than I2C, SMBUS, I3C, and SPMI, but it is still much lower than typical SPI solutions.

The ESPI protocol may select its clock frequency based on required performance and power. Higher clock frequencies provide higher bandwidth but lead to larger power consumption. The ESPI protocol is favorable as far as bandwidth compared to I3C and SPMI. So it is possible to select a lower clock frequency providing lower power while still providing comparable or better bandwidth.

Processor based systems requiring communication between chips on a board typically utilize direct memory access (DMA) to transfer data between the chips. This cases firmware/software timing and response time. The ESPI protocol includes forward looking ACK/NAK status (i.e., "target can handle another byte of write data" and "target can provide another byte of read data") to make utilization of DMA easier. It is envisaged that an ESPI controller would include a multichannel DMA interface to allow the main processor's multichannel DMA controller to efficiently transfer data between the two chips.

The enhanced serial peripheral interface (ESPI) bus offers bandwidth that is comparable to I3C and SPMI, but similar complexity in design to SPI and I2C. The goals of the ESPI bus are medium bandwidth (~9 Mbps for 4 byte bursts), flexible byte width to optimize performance, low pin count, low gate count and complexity for implementation, embedded interrupt, robust framing mechanism, scalable performance based on needs, and case of utilizing multichannel DMA to case the burden of firmware for systems using DMA.

In one aspect, the ESPI bus utilizes 3 pins (SCLK, SDATA0, SDATA1), utilizes robust data transfer framing mechanism, includes embedded interrupts, and allows the ESPI target to provide ACK/NAK feedback for each byte. The ESPI protocol includes a simple clock period width bus turnaround timing to provide robust system level timing as well as simple implementations.

Taking a traditional SPI interface of 5 pins (including interrupt) and reducing it down to 3 pins to create the ESPI means losing the SPI bus select pin. In SPI the SCS pin provides framing reference to the target so that it knows when the transfer starts and ends. The ESPI bus utilizes a robust framing mechanism while maintaining a low pin count.

The ESPI bus protocol provides a simple serial bus protocol providing good performance for device to device communications. Bus clocking is provided so that the ESPI target can use this clock directly as its clock. The timing of the bus at higher frequencies may utilize die pads from SPMI and at lower bus frequencies may use more simple GPIO pad structures. The ESPI bus has the following characteristics:

Unique START and STOP conditions to frame the transfer;
START and STOP conditions cannot occur during normal data traffic;
12 bit Address allowing 4K addressable peripheral space;
4 bit Command providing different types of reads and writes, allowing for expanded address space, incrementing vs non incrementing addresses during bursts, and flexible data routing on the Target side;
Target 4 bit 'Transfer Ack/Nak' to allow the target to signal when it can or cannot respond to a ESPI transfer;
Target Active high 'Byte Ack/Nak' for both writes and reads to provide flow control.
For writes an Ack means current byte accepted and one more may be accepted and a Nak means current byte accepted but no more bytes may be accepted;
For reads an Ack means that the Target can provide at least one more byte of data and a Nak means that the Target cannot provide any more data at this time;
Flexible bus frequency to support different bandwidth needs;
Embedded Target Interrupt;
2 bit parallel data to increase serial transfer speed;
10 bit data 'byte' width—10 bits was chosen to accommodate typical peripherals which use extra bits such as FIFOs (9th bit selects between control/data) and ADC (10 bit ADC is common resolution). Even though 10 bits are sent/received during each byte, the target side may or may not use all 10 bits or less depending on its needs;
Both the ESPI Initiator and ESPI Target may include pulldown resistors (e.g., 100 KΩ resistors) on all lines to protect against floating bus conditions; and
Data is driven from the msb to the lsb.

The ESPI includes the following features and benefits: a Bi-directional serial bus protocol providing "high" bandwidth; and a low pin count of 3 pins. The ESPI may have a maximum bus frequency targeted at 16 MHZ, but other maximum bus frequencies may be used as well. This leads to a bandwidth at 16 MHz of 3.8 Mbps (1 byte transfer), 8.8 Mbps (4 byte transfers), 11.4 Mbps (8 byte transfer), and 13.3 Mbps (16 byte transfer). Each transfer provides a Target Interrupt Status useful in supporting the initiator side DMA operation.

Regarding Flow Control, both reads and writes provide a byte Ack/Nak status from the Target, and a Transfer Target Ack/Nak provides a Target Ack/Nak to allow determination of when the Target is available or not. Nak status provides multiple encodings to provide more detailed information as to why the Target is not available.

The ESPI protocol provides 12 bit address field to support up to 4K peripheral addresses. In other embodiments the address field may include more or less than 12 bits.

The ESPI protocol provides 4 bit command field to support a variety of transfer commands In other embodiments, more or less than a 4 bit command field may be used. Note that the bus timing is not affected by the commands other than read versus write. The transfer commands may include the following transfer commands:

Register—Reads and writes are supported. A target receiving this command knows to auto-increment the address after each byte is transferred;

FIFO—Reads and writes are supported. A target receiving this command knows to keep the address stable during the entire transfer;

Interrupt Only—These are shorter transfers only meant to transfer the interrupt status;

Bus Steering—These commands indicate which memory-mapped input/output (MMIO) bus the Target should steer the transfer to. Again, the ESPI bus transfer timing does not change based on this. It is only for the Target's use.

The ESPI may support two different types of MMIO bus timing on the Target side (Bus Steering). The Transfer Command may specify the Target side MMIO bus to be used. A first bus may include a MMIO L Bus. The MIMO L Bus uses a local device clock. This MMIO L Bus in the Target uses its local free running oscillator (FRO) as the clock source for the bus. The availability of transfers to this bus depends on the whether the Target's local clock is running or not. If the Target's FRO is enabled (clock output gated off or not gated off) then the transfer will be Ack'd by the Target (as long as it is not in reset). If the Target's FRO is disabled, then the transfer will be Nak'd by the Target. The use of the MMIO L Bus has the advantage of allowing for the use of synchronous FIFOs within the Target device. It is noted that the MMIO L Bus is not as efficient as a MMIO B (described below) bus when accessing FIFOs, the MMIO L Bus requires local clock to be running for ESPI Transfer to work, and the local system clock must be fast enough to support incoming ESPI reads and writes.

A first bus may include a MMIO B Bus. The MIMO B Bus in the Target uses the ESPI Bus clock as its clock source. Access to this bus is always available to the ESPI Initiator (exceptions may include when the Target device is in reset or maybe a physical error condition which prevents it from responding) and these transfers will always be acknowledged (unless the Target cannot respond as in the examples). The use of the MMIO B bus has the advantage of not requiring a local clock to be running, does not place restrictions on local system clock frequency, and has very efficient timing to read/write FIFOs. Further, the MMIO B Bus may require use of asynchronous FIFOs, require peripheral's to perform clock domain crossing for register accesses unless they run from the ESPI bus clock, and support that the clock to the registers stops after ESPI transfer is over.

Figure 1:
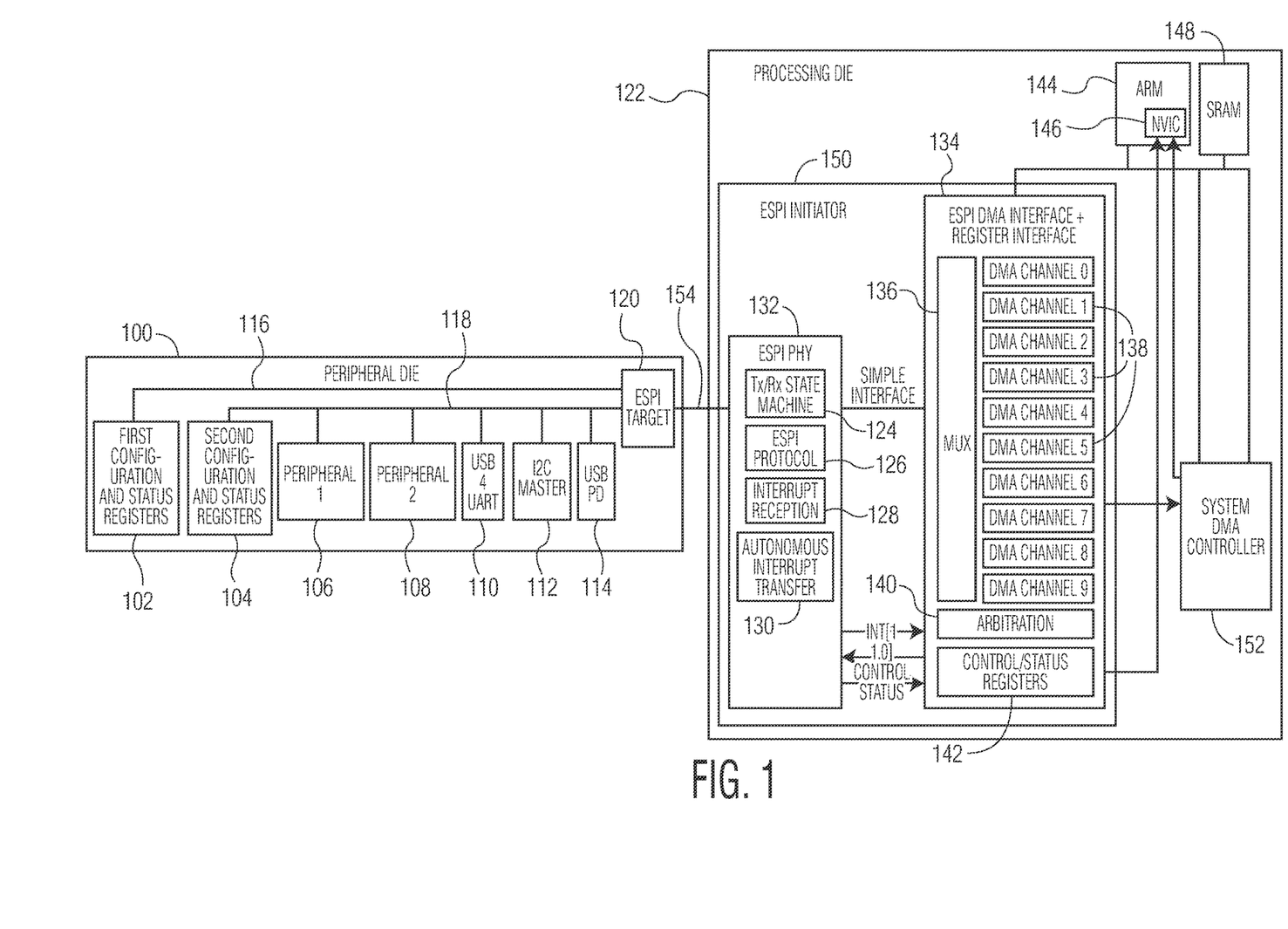
FIG. 1 illustrates an example of a typical use for the ESPI bus.

FIG. 1 illustrates an example of a typical use for the ESPI bus. On one side of the ESPI Bus 154 there is a device that acts as the Initiator on the ESPI Bus 154. In this example, the Initiator is a processing device 122 with embedded ARM processor 144. On the other side of the ESPI Bus 154 there is a peripheral device 100 with many peripherals that the processor may need to access. Example peripherals are USB PD 114, USB Type C, an I2C Master 112, UART, etc.

The processing device 122 includes an ESPI initiator 150 with a EPSI PHY 132 to generate the ESPI timing for each transfer. The EPSI PHY 132 may include a Tx/Rx state machine 124, ESPI protocol 126, interrupt reception 128, and autonomous interrupt transfer 130. The ESPI initiator 150 may also have support for multiple DMA channels to support many data transfers occurring in parallel via a ESPI DMA interface and register interface 134. The ESPI DMA interface and register interface 134 may include Mux 136, DMA channels 138, arbitration module 140, and control/status registers 142. The ARM processor 144 may include a nested vectored interrupt controller (NVIC) 146. The ARM processor 144 may access static random access memory (SRAM) 148. Further a system DMA controller 152 may control access to the SRAM 148.

On the target side, the peripheral device 100 may include a mixture of blocks with FIFOs and MMIO based registers. Note that the target in this case supports two types of MMIO buses including MMIO B Bus 116 and MMIO L Bus 118. The ESPI target 120 routes data from the ESPI Bus 154 to either the MMIO B Bus 116 or the MMIO L Bus 118. The MMIO L Bus 118 uses the local clock as the bus clock. For some ESPI Commands, the Target peripheral device 100 routes the incoming ESPI transfer to the MMIO L bus 118 which uses the target's local clock as the bus clock. In this case the target performs the clock domain crossing to pass the transfer from the ESPI bus clock domain to the internal clock domain. The MMIO B Bus 116 uses the ESPI clock as the bus clock. For other ESPI Commands, the target peripheral die 100 routes the incoming ESPI transfer to the MMIO B bus which uses the ESPI bus clock as the MMIO B bus clock. In this case there is no clock domain crossing.

A first configuration and status registers 102 may be connected to MMIO B Bus 116. A second configuration and status registers 104, Peripheral 1 106, Peripheral 2 108, and Peripheral 3 110 may be connected to the MMIO L Bus 118.

The ESPI Bus 154 may use the following signals on the three pins: SCLK; SDATA0; and SDATA1. The signal SCLK is a Serial Bus Clock that is unidirectional from the Initiator to the Target. The Initiator and Target may have pull down resistors (e.g., 100 KΩ) at the SCLK pins. The signal SDATA0 is a bidirectional signal. Data is clocked out on the rising edge of SCLK and captured on the falling edge of SCLK. The ESPI initiator 150 drives SDATA0 during the START and STOP conditions, during CMD/ADDRESS bits, and during write data bits. The ESPI target 120 drives SDATA0 during read data bits and during Ack/Nak bits. The Initiator and Target may have pull down resistors (e.g., 100 KΩ) at the SDATA0 pins.

The signal SDATA1 is a bidirectional signal. Data is clocked out on the rising edge of SCLK and captured on the falling edge of SCLK. The ESPI initiator 150 drives SDATA1 during the write data bits. The ESPI target 120 drives SDATA1 during Target Ack bits, Target Interrupt bits, and during read data bits. The Initiator and Target may have pull down resistors (e.g., 100 KΩ) at the SDATA1 pins.

A functional description of the ESPI Bus 154 will be provided. The ESPI includes 3 signals (one clock SCLK and 2 data SDATA0 and SDATA1), the ESPI bus protocol provides both a START and STOP condition which the Target may use asynchronously to reset its state machines like in I2C Slave designs. Data is driven on the rising edge and captured on the falling edge to provide both setup and hold margins.

A Bus Request allows the Target to request access for pending interrupts. To accomplish this the Target simply drives SDATA1 high between transfers.

A Start Condition is a unique condition that Target can detect to determine a start of a packet. The start condition may be indicated by a high signal on the SCLK line for three clock cycles and a high signal on the SDATA0 line during the second cycle of the three cycles. More generally it may be described as a high signal on the first line for a first number of clock cycles and a high on the SDATA0 line a second number of clock cycles where the first number is greater than the second number.

A Command Interrupt CMD[3:0] including 4 bits may be driven on the bus from the most significant bit (msb) to the least significant bit (lsb). A few examples of CMD values will now be described.

When CMD='0000' it indicates an Interrupt Only.

The following are Target Side MMIO L Bus 118 Related Commands, and these commands may be passed by the Target to its internal MMIO L Bus 118 which uses its local clock as the MMIO L Bus clock. When CMD='1000' it indicates a Register Write to the MMIO L Bus 118. The Target should auto-increment the address after each data byte. A typical behavior is for register accesses to always acknowledge each byte, but this is not required.

When CMD='1001' it indicates a Register Read from the MMIO L Bus 118. The Target should auto-increment the address after each data byte. A typical behavior is for register accesses to always acknowledge each byte, but this is not required.

When CMD='1010' it indicates a FIFO Write to the MMIO L Bus 118. The Target should not increment the address during the transfer.

When CMD='1011' it indicates a FIFO Read from the MMIO L Bus 118. The Target should not increment the address during the transfer.

The following are Target Side MMIO B Bus 116 Related Commands, and these commands may be passed by the Target to its internal MMIO B Bus 116 which uses the ESPI Bus clock as the MMIO B bus clock. When CMD='1100' it indicates a Register Write to the MMIO B Bus 116. The Target should auto-increment the address after each data byte. A typical behavior is for register accesses to always acknowledge each byte, but this is not required.

When CMD='1101' it indicates a Register Read from the MMIO B Bus 116. The Target should auto-increment the address after each data byte. A typical behavior is for register accesses to always Ack each byte, but this is not required.

When CMD='1110' it indicates a FIFO Write to the MMIO B Bus 116. The Target should not increment the address during the transfer.

When CMD='1111' it indicates a FIFO Read from the MMIO B Bus 116. The Target should not increment the address during the transfer.

All other values for CMD may be reserved for future use. Further, the values and the related commands are provided only as examples. Other values may be associated with the commands and additional commands may also be further added and defined.

An Address Interrupt ADDR[11:0] including 12 bits may be used allowing up to 4K addresses. Addresses are byte aligned and driven on the bus from the msb to the lsb.

A Target Acknowledge Target Ack[3:0] including 4 bits allows for a robust acknowledge plus the possibility of signaling a Target chip status. The Target Ack may be driven on the bus from the msb to the lsb. The following encoding may be used as example Ack/Nak Encoding (but the example is not a requirement). When TargetAck[3:0]='0000' it indicates not acknowledged (Nak) and means that the Target in reset. When TargetAck[3:0]='0011' it indicates Nak and means that the Target is booting. When TargetAck[3:0]='1001 it indicates Nak and means that the Target clock is not running. Note that this can be an treated as an Ack if the CMD bits specify the MMIO B bus because that bus uses the ESPI bus clock and so is always available for access. When TargetAck[3:0]='1010' it indicates an acknowledge (Ack).

A Target Interrupt Target Interrupts [11:0] including 12 interrupts (i.e., each bit indicates one of the 12 interrupts) in order to provide enough for each interface to provide efficient DMA transfers. Bit 11 typically is the OR of Target Interrupt bits 31:12. The Target Interrupt is driven on the bus from the msb to the lsb. Bits 10:0 of the Target Interrupt are typically the Target's internal interrupt bits 10:0. Normally the Target would assign these interrupts to things directly relating to the ESPI. For example, interrupt 0 could pertain to peripheral 0's Tx FIFO, interrupt 1 could pertain to peripheral 0's Rx FIFO, interrupt 2 could pertain to peripheral 1's Tx FIFO, etc.

The ESPI Bus 154 includes Bus Turnaround Cycles. A first Bus Turnaround Cycle is a Write Data with Bus Turnaround (Initiator to Target)+Ack+Bus Turnaround (Target to Initiator) between bytes (e.g., 10 bit 'bytes', 5 bits each data line). The data bytes are driven on the bus from the msb to the lsb. A second Bus Turnaround Cycle is a Read Data+Ack+Bus Turnaround (Target to Initiator)+Bus Turnaround (Initiator to Target) between bytes (e.g., 10 bit 'bytes', 5 bits each data line). The first bus turnaround is needed to allow the Initiator to drive a STOP condition. The data bytes are driven on the bus from the msb to the lsb. A larger or small number of bits may also be sent on SDATA0 and SDATA1.

A Stop Condition is a unique condition that the Target can detect to determine an end of the packet. The stop condition may be indicated by a low signal on the SCLK line for three clock cycles and a high signal on the SDATA0 line during the second cycle of the three cycles. More generally it may be described as a low signal on the first line for a first number of clock cycles and a high on the SDATA0 line a second number of clock cycles where the first number is greater than the second number.

Flow Control using a Target Byte Ack/Nak Status will now be described. The Target issues an Ack/Nak after every data byte. For writes, the Ack means that the Target can accept the next byte of data. A Nak would mean that it cannot accept any more data. For reads, the Ack means that the Target can provide at least one more byte of data. A Nak means that it cannot provide any more data at this time.

The assumption from the ESPI Initiator is that it can always perform at least one write or one read. The ESPI Initiator will not start a data transfer without having knowledge that this is true (i.e., interrupts or status/control from its controlling logic such as F/W).

The basic ESPI transfer starts with the Initiator issuing the START condition (SCLK high while SDATA0 pulses high) followed by the CMD[3:0] and ADDRESS [11:0] bits, followed by the data bytes (with bus turnaround and Ack/Nak for each byte). The ESPI transfer then ends with a STOP condition. During the CMD/ADDRESS phase, the Target sends the Target Ack and Target Interrupt information.

As far as the bus protocol and timing are concerned, all writes (Register, FIFO, MMIO L based, and MMIO B based) are the same. The Register vs FIFO and MMIO L vs MMIO B is meant only as an indication of how the Target should handle the transfer. The same is true for reads. All reads (Register, FIFO, MMIO L based, and MMIO B based) have the same protocol and timing.

All ESPI signals are timed by the ESPI clock, SCLK. Data must be driven on the rising edge of SCLK and sampled on the falling edge of SCLK.

Figure 2A:
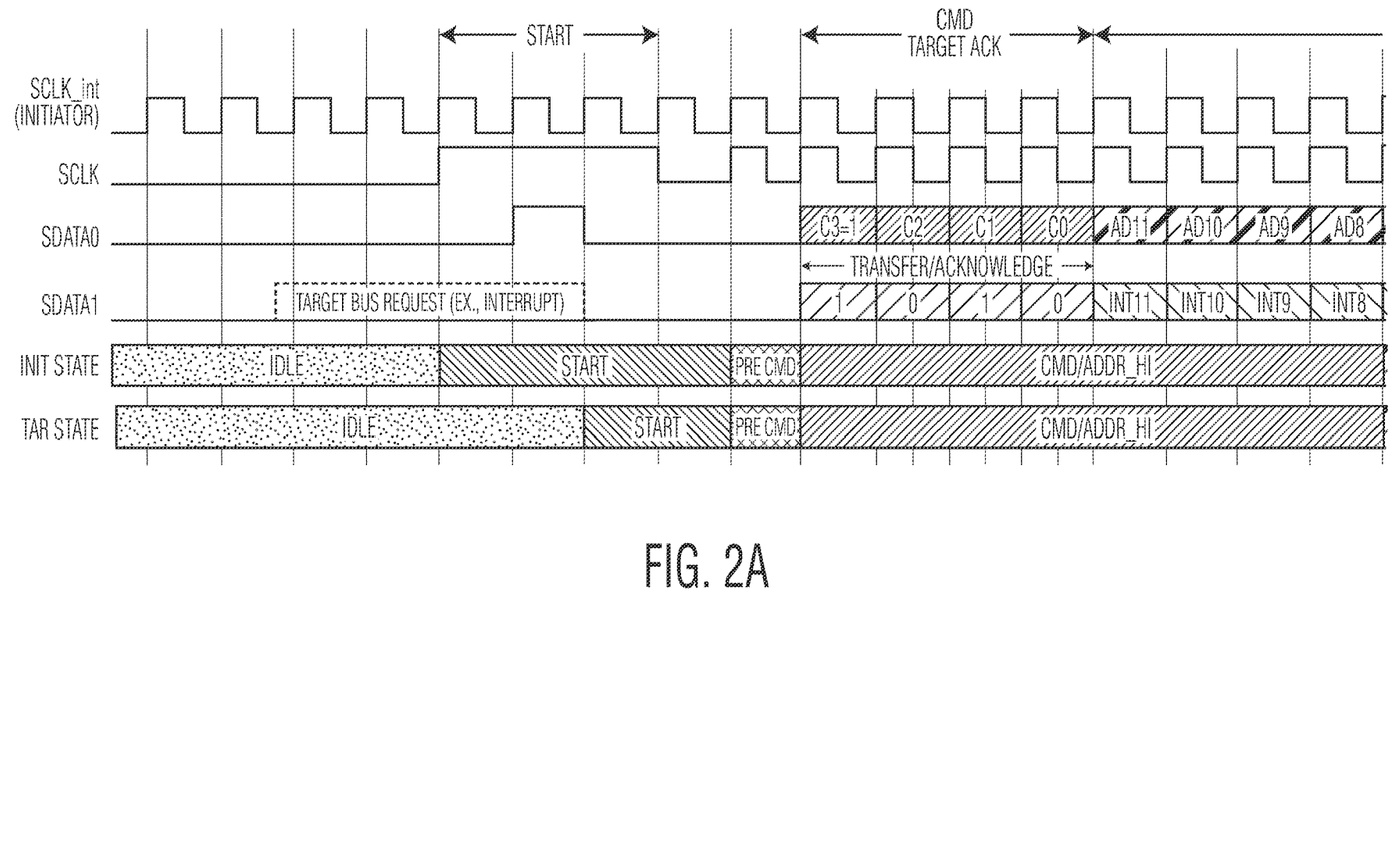
FIGS. 2A-C illustrate the timing diagram for a typical ESPI write.
Figure 2B:
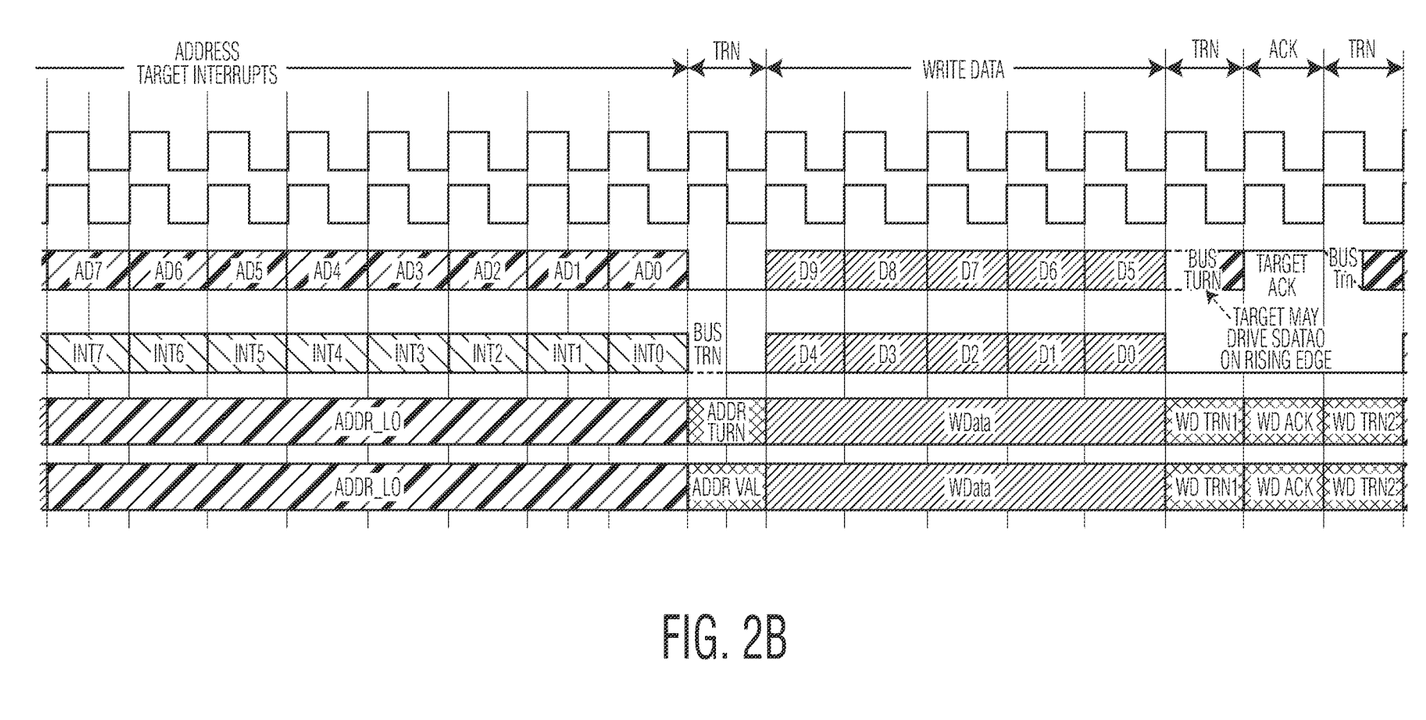
Figure 2C:
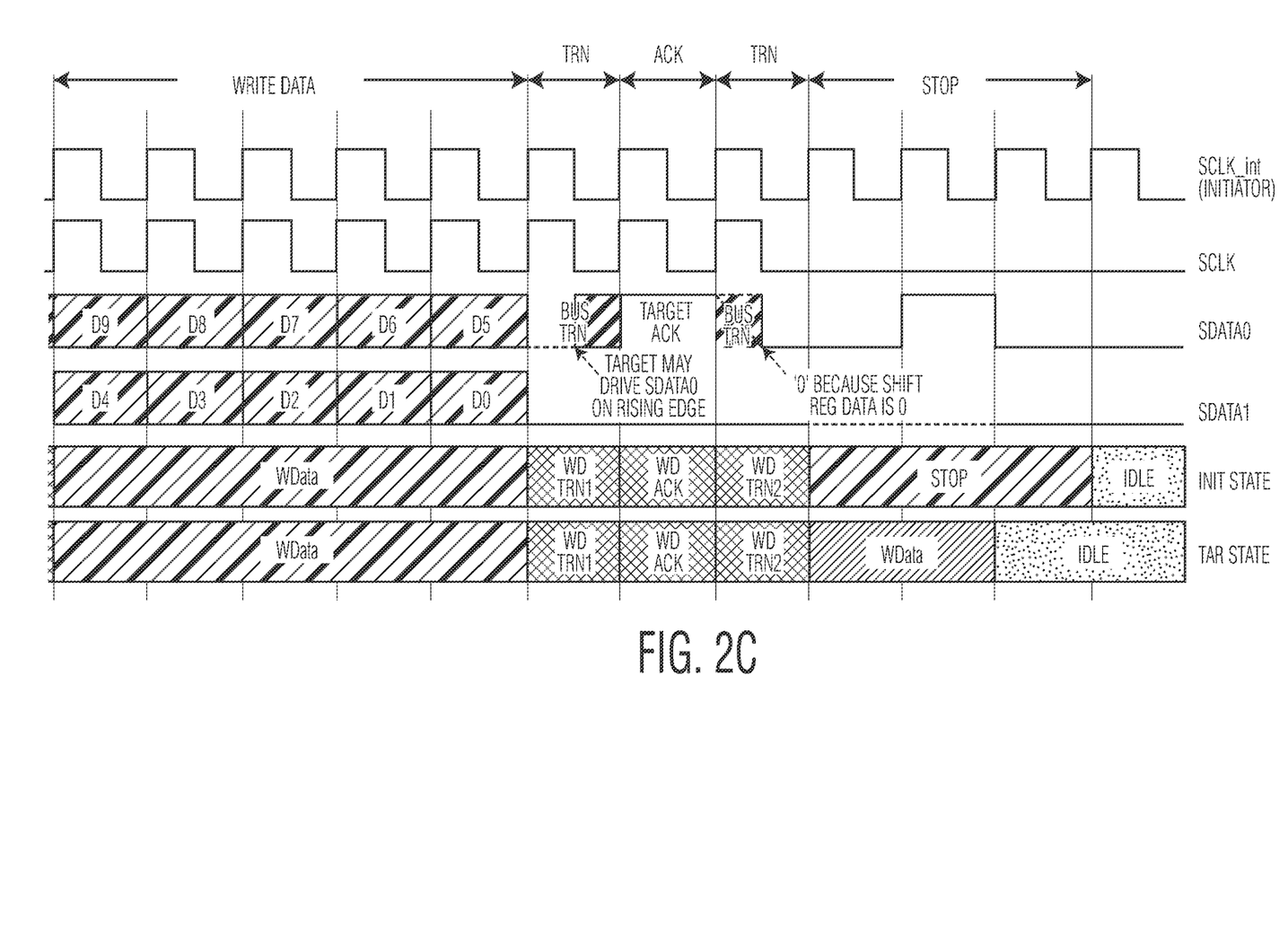

FIGS. 2A-C illustrate the timing diagram for a typical ESPI write. The diagram shows timing and/or states for a SCLK_int signal, SCLK signal, SDATA0 signal, SDATA1 signal, Initiator state, and Target state. The SCLK_int is an internal clock of the Initiator that is used to drive the bus clock SCLK. The SCLK, SDATA0, and SDATA1 signals are as described above. The timing diagram extends from FIG. 2A to 2B to 2C in order to show the whole timing sequence.

The example timing illustrated in FIGS. 2A-C is for a 2 byte write where the Initiator stopped the transfer by issuing a STOP condition. Example Initiator and Target State Machine states are given for reference. The ESPI Initiator Internal bus clock is included for timing reference.

The timing diagram shows that the Target may assert SDATA1 high to indicate a request for attention as shown by a dotted line on at the beginning of SDATA1 in FIG. 2A. If the ESPI Initiator detects this request, then the ESPI initiator may initiate a transfer. If the ESPI initiator has no pending data transfers, the ESPI initiator may just issue an Interrupt only transfer to retrieve Interrupt information from the Target (shown in a later section), or as in this example, the ESPI initiator had a pending write transfer and so initiated the write. An attention request is not required to start a transfer. Any time the ESPI Initiator has data to transfer it may issue a read or write command.

The ESPI data transfer starts with a START condition (SCLK pulsing high for 3 bus clocks while SDATA0 pulsing high for one bus clock in the middle of the SCLK high pulse). This implementation of the start condition prevents any ambiguity in the signaling that could lead to a false start indication. When the SCLK start pulse begins, the Initiator enters a Start state as shown. When the SDATA0 start pulse begins, the Target enters a Start state as shown.

The START is followed by one SCLK pulse. This provides some time for the Target to capture its internal Target Ack/Nak Status as well as its Interrupt Status prior to driving them on the bus in the next step. This places both the Initiator and Target in a pre-command state.

This is followed by 4 clocks of CMD and Target Ack/Nak information driven from the msb to the lsb). The ESPI Initiator drives CMD bits (C3, C2, C1, and C0) onto SDATA0 and the ESPI Target drives 4 bits of Target Ack/Nak (1, 0, 1, 0) onto SDATA1 to indicate Ack.

This is followed by 12 clocks of ADDRESS (AD11-AD0) and Target Interrupt (INT11-INT0) driven from the msb to the lsb. The Initiator and Target being in the CMD, ADDR_HI, and ADDR_Lo states as shown.

At this point if the ESPI Initiator had detected a Target Nak condition (Target Ack/Nak bits=Nak) then it would end the transfer by issuing a STOP condition. But because an Ack was received the write continues.

After the ADDRESS/TargetInterrupt bits, there is one clock to allow turn around for SDATA1 because the ESPI Initiator needs to drive it next. Note that SDATA0 remains driven by the ESPI Initiator.

After the turn around clock, there are 5 clocks for write data transfer. This transfers 10 bits worth of data, i.e., 5 bits each on the SDATA0 and SDATA1 line. This results in the Initiator and the Target being in the WData (write data) mode. A larger or smaller number of bits may instead be sent on SDATA0 and SDATA1.

After this there is one clock for bus turnaround followed by the target driving its 'byte Ack/Nak' onto SDATA0 followed by another bus turnaround.

Note that this Ack/Nak is not for the just sent write data, it is for the upcoming data byte. An 'Ack' means that the Target can accept another data byte. A 'Nak' means the Target cannot accept another data byte at this time.

Note that SDATA1 is driven by the Initiator during this entire time as it does not require a bus turnaround like SDATA0.

After this, the data will be repeatedly written followed by the turn around/ACK/turn around process until either the Target Nak's the data byte or the ESPI Initiator issues a STOP to end the transfer.

The transfer ends in this example with the Target issuing an Ack (meaning it can take more data), but the Initiator issuing a STOP to end the transfer. The STOP is indicated by SCLK going low for at least three clock cycles and then SDATA0 going high on the second clock cycle when SCLK is low. Again, this implementation of the stop condition prevents any ambiguity in the signaling that could lead to a false stop indication.

Note that the pulldowns on the signals are weak. Depending on the SCLK frequency, a data line may remain unchanged during a clock period if floated by both sides, or it may discharge somewhat.

Note that while most portions of the transfer operate on entire clock periods, there are some areas that operate on half clock periods. These are as follows:

Just before each msb write data bit is sent, the ESPI Initiator may enable its driver on SDATA1 (between ADDRESS and first data byte) or SDATA0 (all subsequent data bytes) on the falling edge of SCLK prior to driving the first data bit on the next rising edge. This is shown by the appropriate data line going from a dotted line (implying tristate) to a solid line (implying being driven) (see BUS TRN). By allowing the Initiator to enable its output then, the timing to drive the first bit is improved (it now matches the timing of every other bit). Note that the value of the data line when the initiator starts driving after the falling edge of SCLK is unknown and maybe anything. The Target will not capture data during this time, so this situation is acceptable.

After every write data byte, the Target may enable its output driver on the falling edge of SCLK during the bus turnaround time. The value driven at this time is unknown. The target will drive the actual Ack/Nak value on the next rising edge of SCLK. This improves the timing of the Target's Ack/Nak bit.

Before generating the STOP bit, the Initiator may start driving SDATA0 on the falling edge of SCLK.

Note that SDATA1 changes owners at the end of the transfer. After the last data byte, the Initiator was driving SDATA1. As soon as it enters its STOP generation state it tristates its SDATA1 output. Then as soon as the Target detects the STOP condition (falling edge of SDATA0) it starts driving SDATA1.

Note that after each data byte, the timing diagram shows that SDATA1 is low. This is not a requirement and may be any value. The line may possibly remain at the last data bit value.

Figure 3:
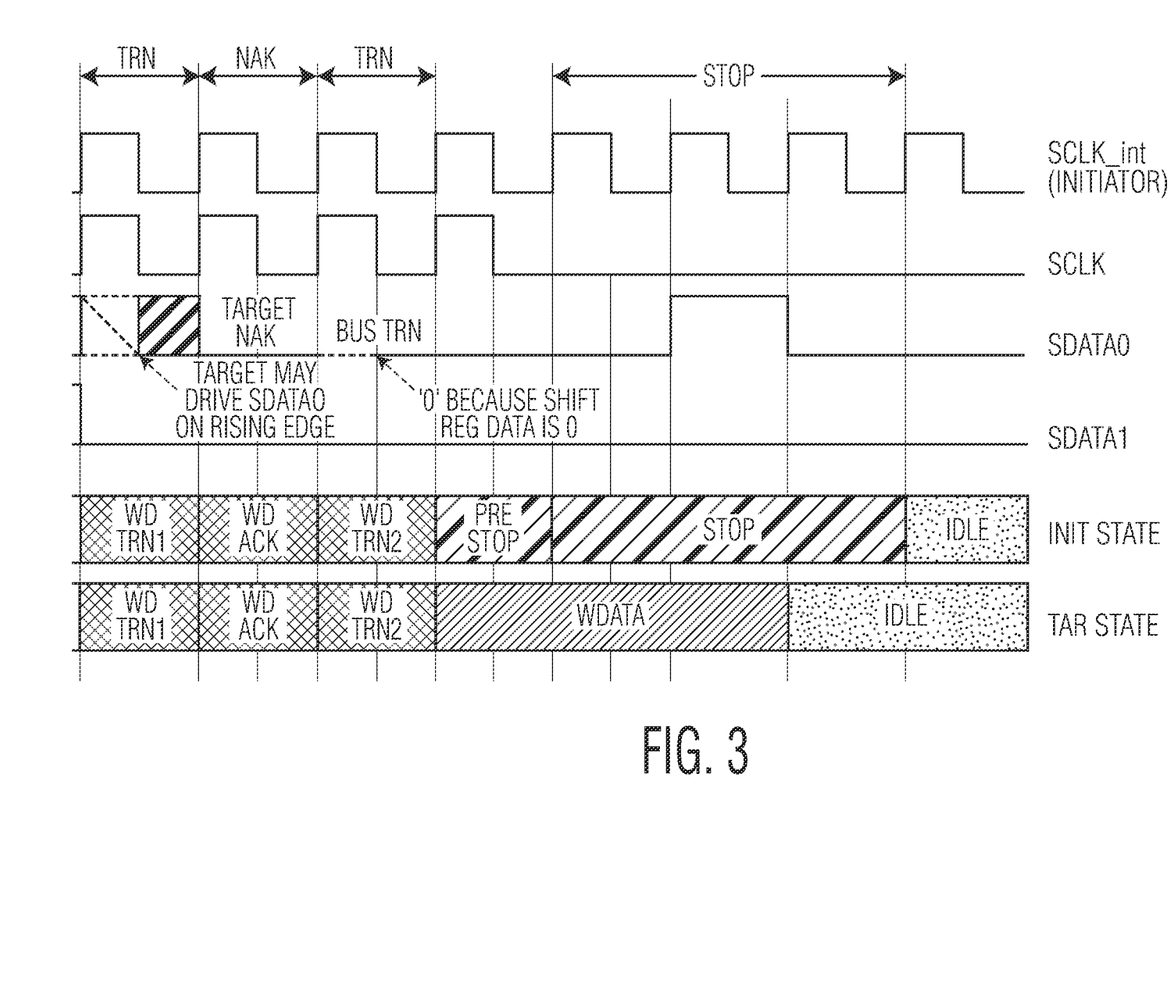
FIG. 3 illustrates the exact same example as illustrated in FIGS. 2A-C.

FIG. 3 illustrates the exact same example as illustrated in FIGS. 2A-C except that the Target sends a Nak after the last data byte. This means that the Target cannot accept any more data. As the timing of this transfer looks the same as the previous example illustrated in FIGS. 2A-C except for the generation of the STOP condition only the last portion of the timing diagram is illustrated in FIG. 3. Note that there is one extra clock inserted before the STOP condition is generated.

This may not be required depending on the timing achieved in the ESPI Initiator. In other embodiments, the stop portion for writes with a Target Nak may be identical to the Write illustrated in FIGS. 2A-C. The difference in timing does not affect the Target behavior as it will still recognize the STOP condition when it is generated.

Figure 4A:
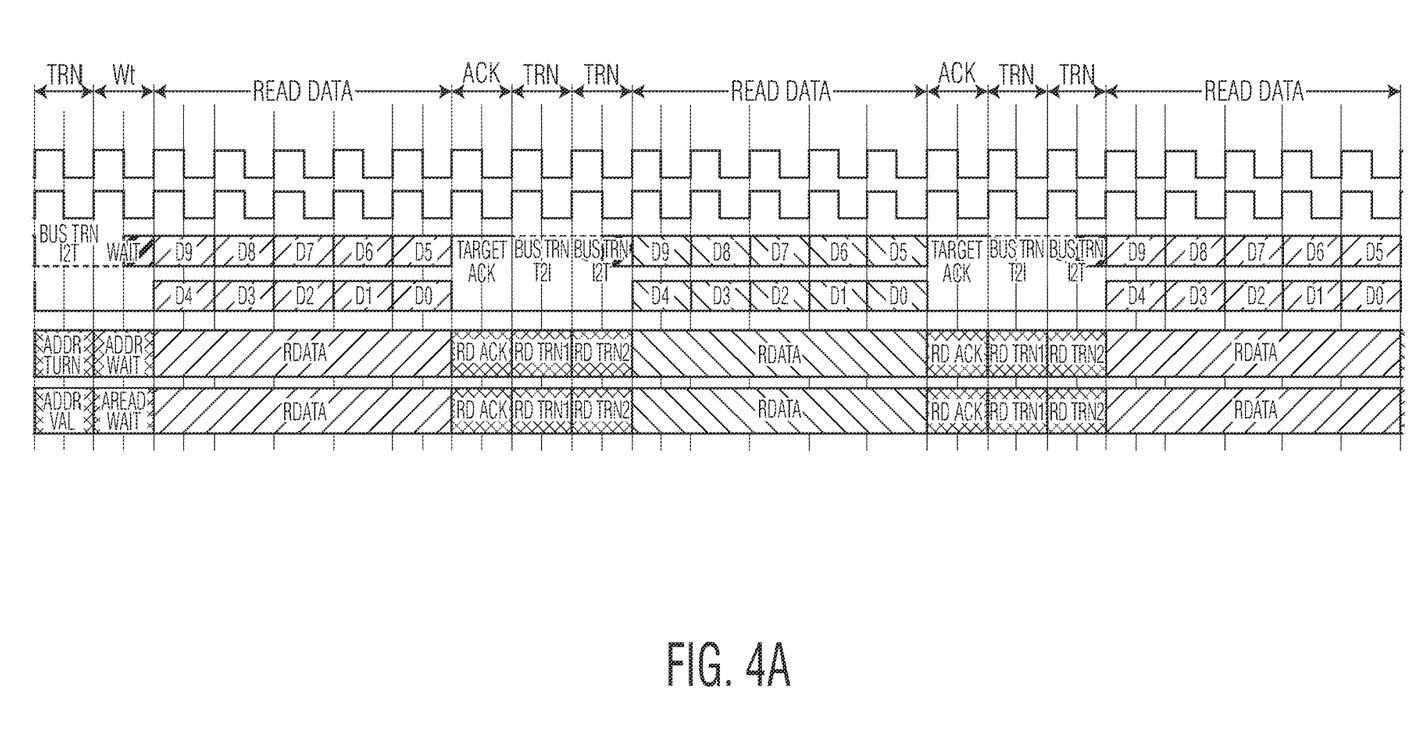
FIGS. 4A and 4B illustrate the timing diagram for a typical ESPI read that is ended by the Initiator.
Figure 4B:
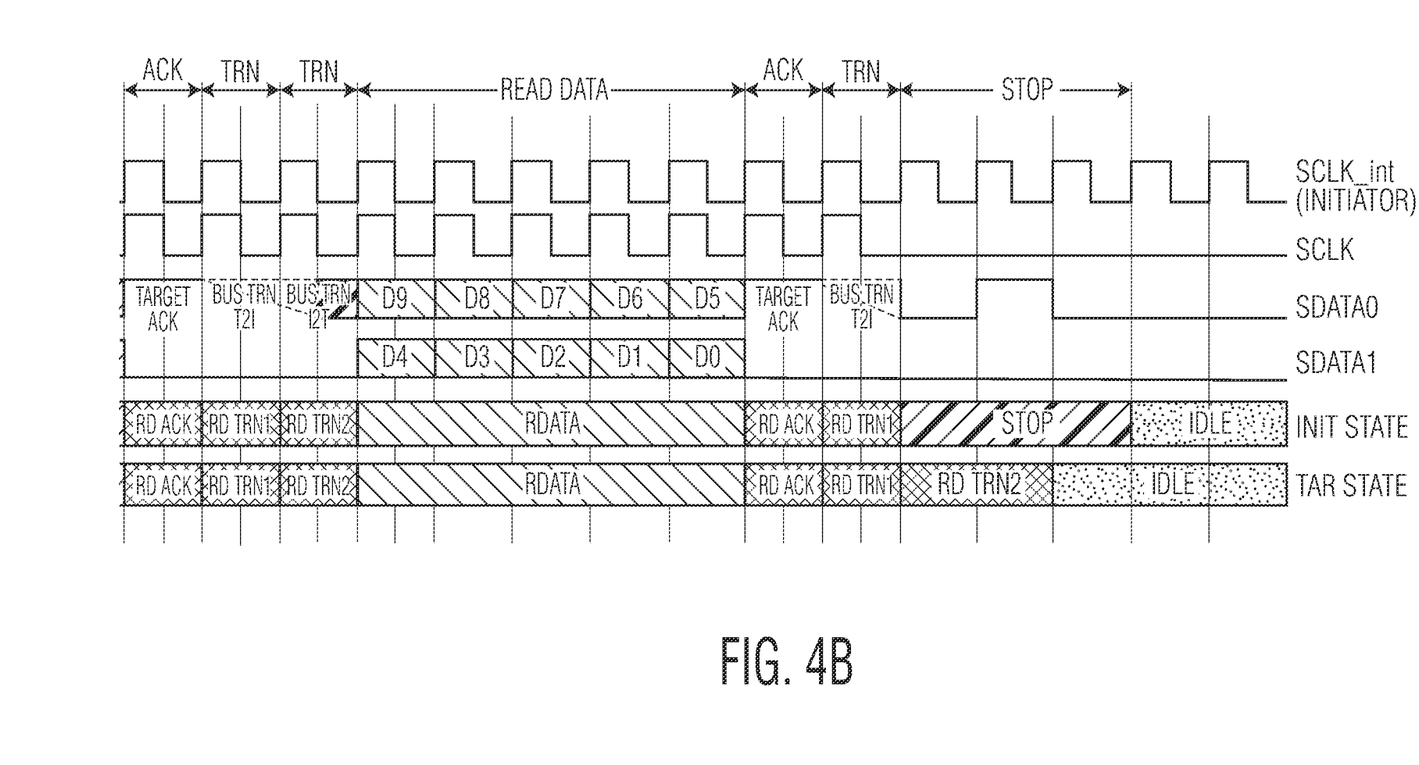

FIGS. 4A and 4B illustrate the timing diagram for a typical ESPI read that is ended by the Initiator. FIGS. 4A and 4B do not show the first part of the timing diagram. The START, CMD, ADDRESS, and Target Interrupts for the timing diagrams of FIGS. 4A and 4B are identical to those of FIGS. 2A and 2B. The example timing illustrated in FIGS. 4A and 4B is for a 4 byte read where the Initiator stops the transfer by issuing a STOP condition. A 4 byte read is only an example, and other numbers of bytes may be read as well. Example Initiator and Target State Machine states are given for reference. The ESPI Initiator Internal bus clock is included for timing reference.

After the ADDRESS phase there is one clock of bus turn around to allow the SDATA0 line to be driven by the Target. Then there is one more clock to provide one wait state before the Target has to start driving read data. Note that during this time the SDATA1 pin does not change direction. It is shown as being a stable 0 value, but this is not a requirement. It may be any value during this time. Also note that the Target may enable its SDATA0 output driver on the falling edge of SCLK before the read data phase. This allows the Target to improve the timing of the first data bit (i.e., makes it the same as every other data bit). The value of SDATA0 during this half clock before the read data phase is not specified and may be any value.

Next, there are 5 clocks of read data (D9-D5 on SDATA0 and D4-D0 on SDATA1) sent from the msb to the lsb.

Then there is one clock where the Target drives SDATA0 with its byte Ack/Nak information, then one clock of bus turnaround (Target to Initiator), and then one more clock of bus turnaround (Initiator to Target). The first turnaround allows the initiator to drive STOP to end the transfer if it desired. Note during this time SDATA1 is shown as being stable low, but this is not a requirement. It may be any value during this time. Also note that the Target may enable its SDATA0 output driver on the falling edge of SCLK before the next data phase. The value of SDATA during this half clock before the next data phase is not specified and may be any value. Further, note that the lines have weak pulldown resistors on them. Depending on the bus clock frequency, the bus may remain stable during the bus turnaround time or may discharge somewhat.

Now data will be repeatedly read followed by the ACK/turn round/turn around process until either the Target issues a Nak or the Initiator wants to issue a STOP. In this example the Target issues an Ack after the last data byte indicating that it can provide more data, but the Initiator issues a STOP to end the transfer. As before, the STOP condition is 3 bus clocks long. Note that SDATA1 remains driven by the Target after the last data byte.

Figure 5:
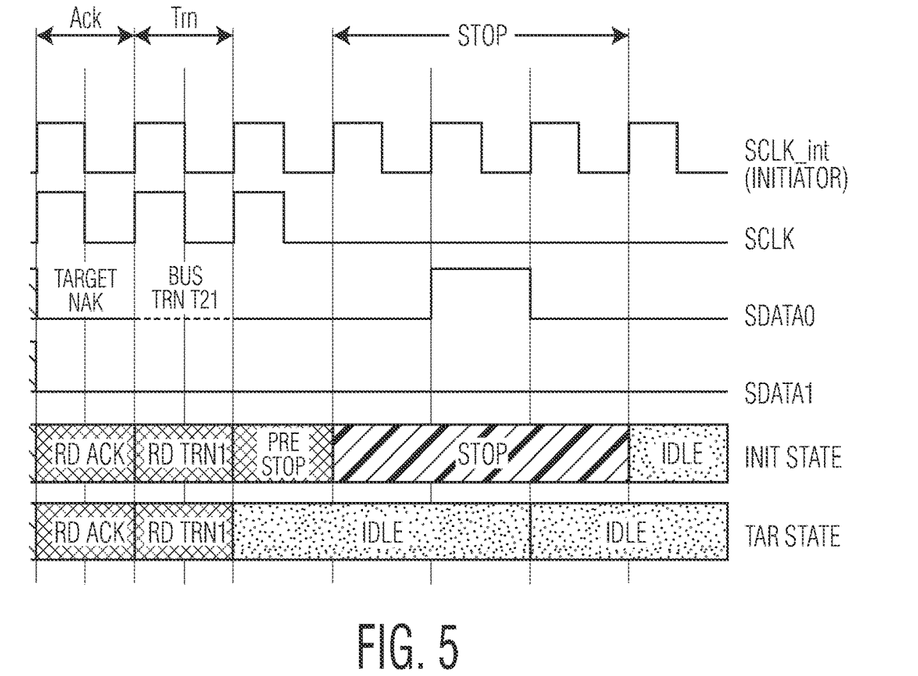
FIG. 5 illustrates the exact same example as illustrated in FIGS. 4A-B.

FIG. 5 illustrates the exact same example as illustrated in FIGS. 4A-B except that the Target sends a Nak after the last data byte. This means that the Target cannot provide any more data. As the timing of this transfer looks the same as the previous example illustrated in FIGS. 4A-B except for the generation of the STOP condition only the last portion of the timing diagram is illustrated in FIG. 5. Note that there is one extra clock inserted before the STOP condition is generated. This may not be required depending on the timing achieved in the ESPI Initiator. In other embodiments, the stop portion for reads with a Target Nak may be identical to the Read illustrated in FIGS. 4A-B. The difference in timing does not affect the Target behavior as it will still recognize the STOP condition when it is generated.

Figure 6:
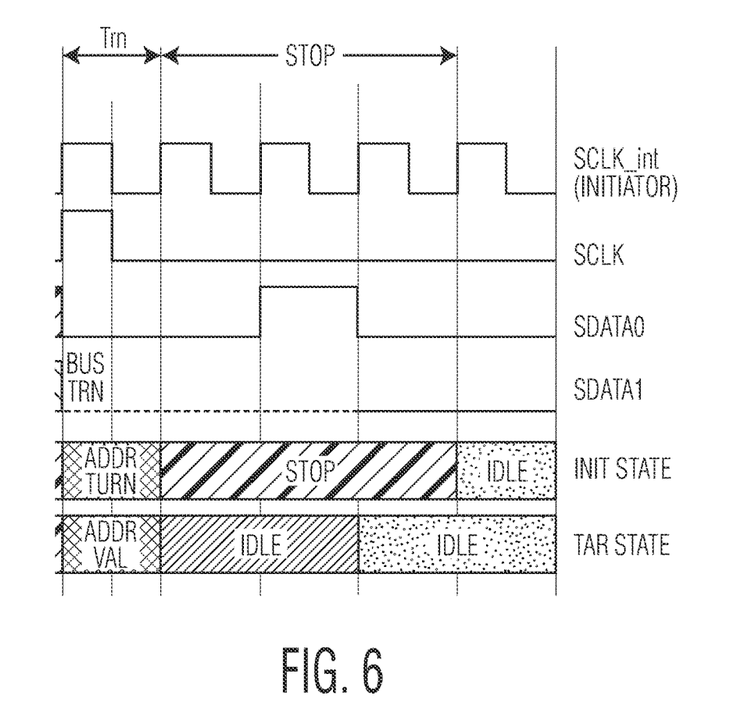
FIG. 6 illustrates the end portion of an interrupt only cycle.

FIG. 6 illustrates the end portion of an interrupt only cycle. The timing diagram for the beginning of the interrupt only cycle is the same as for all of the previous examples up through the turnaround action after the Address and Target Interrupts are received. This would be the case if the Target asserted SDATA1 high (as indicated by the dashed line shown at the beginning of the timing diagram in FIG. 2A) to request attention, and the Initiator does not have any pending transfers to start. Example Initiator and Target State Machine states are indicated for reference as before.

Because this is an Interrupt Only cycle, following the ADDRESS phase, the Initiator issues a STOP. The first clock following the ADDRESS phase is a bus turnaround cycle. The Target may or may not perform a turnaround depending on how it treats the Interrupt Only.

The ESPI Initiator must not drive SDATA1 after the ADDRESS phase in this case to avoid possible contention with the Target. After this the Initiator generates the clock STOP condition. Note that after the STOP condition, the Target starts driving SDATA1.

A Target may implement a watchdog timeout based on the expected duration of a transfer. If any transfer goes beyond this length, then the watchdog timer will timeout and reset the Target State Machine back to Idle. The watchdog timer will use an internal free running clock to allow catching of this error type.

For example, the Initiator may start a write transfer but suffers a reset during the write. As it is going through its reset, the ESPI bus is returned to IDLE. In this example the Initiator may be driving all 3 lines, but in an actual error case the Target could have been driving SDATA0 and SDATA1 if it was a read transfer. If this was the case, then the initiator would not be able to drive the START condition when it recovered.

To free the Target, the watchdog would timeout after the configured timeout. This timeout may be configured by the Initiator in cases where the bus frequency was variable. Resetting the Target state machine upon the watchdog timeout frees up the ESPI bus allowing the Initiator to drive START condition when it finally comes out of its reset. It also allows the Target to assert SDATA1 should there be any pending interrupts.

Now a description of how possible error handling may be implemented is provided. One type of error is when the Target side gets reset unexpectedly. In this case there is NO need for special handling. The ongoing ESPI transfer will see a data byte Nak causing the current transfer to end. The Initiator will end up seeing a Nak for the next data byte (possibly the data byte after that depending on how fast SDATA0 discharges) because the pulldown on SDATA0 will pull the line down. The Target will Nak all transfers until it comes out of reset. Also, the Target will not recognize ESPI traffic until it sees a START. Then the Initiator will end up seeing a Transfer Nak if it initiates another transfer prior to the ESPI Target completing its bootup. It is recommended that the Target generate an interrupt upon completing its bootup so that the processing device knows the Target underwent a reset and is now available for access.

In another type of error, the Initiator side gets reset unexpectedly and relies on Target side watchdog timer. SCLK would drop low and remain this way for a while until Initiator side completes its boot. The Target would detect the transfer getting stuck in the current sub-phase and suffer a watchdog timeout. This would asynchronously reset it back to its IDLE state. The timeout detects that the transfer is longer than the expected max length transfer.

In another type of error, the Initiator side aborts an ESPI transfer due to being commanded by higher level control (ex., F/W). Note that an assumed ESPI Initiator should always gracefully end an aborted transfer, but if it does not gracefully abort the transfer, then the error solution relies on Target side watchdog timer. This scenario is like the Initiator side gets reset unexpectedly scenario except that here, the F/W must wait for some time (Wait>Target watchdog timeout) before starting the ESPI transfers again, and the F/W has to expect that the first transfer after the aborted one may be Nak'd.

A Transfer Watchdog Timer in the Target may use a local clock running during ESPI transfers. The Timeout may be programmable up to 4 ms, which comes from the fact that a 32 byte transfer running on a 1 MHZ ESPI bus will take 1.1 ms to complete. Other Timeout values may be used. The Transfer Watchdog Timer may be active only during a transfer and reset while Target SM Idle between transfers. The watchdog timer may be started when START is received. If the watchdog limit is not reached the watchdog timer may be stopped when the STOP is received.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A method of communicating over a bus using only a clock line, first data line, and second data line between an initiator and a target, comprising:
    sending, by the initiator, a start indication on the clock line and the first data line;
    sending, by the initiator, command bits followed by address bits on the first data line;
    sending, by the target, target acknowledge information followed by target interrupt information on the second data line while the command bits and address bits are sent; and
    sending, by the initiator, a stop indication on the clock line and the first data line.

2. The method of claim 1, further comprising:
    sending, by the initiator, write data to the target on the first data line and the second data line when the command bits indicate a write operation;
    performing a first bus turnaround on the first data line to allow the target to transmit on the bus;
    sending, by the target, an acknowledge/not acknowledge bit on the first data line; and performing a second bus turnaround on the first data line to allow the initiator to transmit on the bus.

3. The method of claim 2, further comprising:
sending, by the initiator, additional write data to the target on the first data line and the second data line when the previous acknowledge/not acknowledge bit indicates an acknowledgement.

4. The method of claim 2, wherein the target starts driving the first data line on a falling edge of a clock signal on the clock line during the first bus turnaround.

5. The method of claim 2, further comprising:
starting, by the target, a watchdog timer when the start indication is sent; and
resetting the target to an idle mode when the watchdog timer expires,
wherein the watchdog timer is stopped when the stop indication is sent.

6. The method of claim 1, further comprising:
performing a first bus turnaround on the first data line to allow the target to transmit on the bus when the command bits indicate a read operation;
sending, by the target, read data to the initiator on the first data line and the second data line when the command bits indicate a read operation;
sending, by the target, an acknowledge/not acknowledge bit on the first data line;
performing a second bus turnaround on the first data line to allow the initiator to transmit on the bus; and
performing a third bus turnaround on the first data line to allow the target to transmit on the bus.

7. The method of claim 6, further comprising:
sending, by the target, additional read data to the initiator on the first data line and the second data line when the previous acknowledge/not acknowledge bit indicates an acknowledgement.

8. The method of claim 6, wherein the target starts driving the first data line on a falling edge of a clock signal on the clock line during the first bus turnaround.

9. The method of claim 1, wherein the start indication includes a high signal for three clock cycles on the clock line and a high signal for a second clock cycle of the three clock cycles on the first data line.

10. The method of claim 1, wherein the start indication includes a high signal for a first number of clock cycles on the clock line and a high signal for a second number of clock cycles on the first data line, wherein the first number is greater than the second number.

11. The method of claim 1, wherein the stop indication includes a low signal for three clock cycles on the clock line and a high signal for a second clock cycle of the three clock cycles on the first data line.

12. The method of claim 1, wherein the stop indication includes a low signal for a first number of clock cycles on the clock line and a high signal for a second number of clock cycles on the first data line, wherein the first number is greater than the second number.

13. The method of claim 1, further comprising:
sending by the target a target bus request before sending, by the initiator, a start indication on the clock line and the first data line.

14. The method of claim 1, wherein data is driven on the first line and the second line by the rising edge of a clock signal on the clock line and captured on the falling edge of the clock signal.

15. A bus system, comprising:
a clock line;
a first data line;
a second data line;
an initiator connected to a first end of the clock line, the first data line, and the second data line,
wherein the initiator is configured to:
send a start indication on the clock line and the first data line;
send command bits followed by address bits on the first data line; and
send a stop indication on the clock line and the first data line; and
a target connected to a second end of the clock line, the first data line, and the second data line,
wherein the target is configured to:
send target acknowledge information followed by target interrupt information on the second data line while the command bits and address bits are sent; and
wherein the start indication includes a high signal for three clock cycles on the clock line and a high signal for a second clock cycle of the three clock cycles on the first data line.

16. The bus system of claim 15, wherein the initiator is further configured to:
send write data to the target on the first data line and the second data line when the command bits indicate a write operation; and
perform a first bus turnaround on the first data line to allow the target to transmit on the bus system; and
the target is further configured to:
send an acknowledge/not acknowledge bit on the first data line; and
perform a second bus turnaround on the first data line to allow the initiator to transmit on the bus system.

17. The bus system of claim 16, wherein the initiator is further configured to send additional write data to the target on the first data line and the second data line when the acknowledge/not acknowledge bit indicates an acknowledgement.

18. The bus system of claim 16, wherein the target is further configured to start driving the first data line on a falling edge of a clock signal on the clock line during the first bus turnaround.

19. The bus system of claim 16, wherein the target is further configured to:
start a watchdog timer when the start indication is sent; and
reset the target to an idle mode when the watchdog timer expires,
wherein the watchdog timer is stopped when the stop indication is sent.

20. The bus system of claim 16, wherein the initiator is further configured to:
perform a first bus turnaround on the first data line to allow the target to transmit on the bus system when the command bits indicate a read operation; and
perform a third bus turnaround on the first data line to allow the target to transmit on the bus system after the second bus turnaround;

the target is further configured to:
- send read data to the initiator on the first data line and the second data line when the command bits indicate a read operation;
- send an acknowledge/not acknowledge bit on the first data line; and
- perform a second bus turnaround on the first data line to allow the initiator to transmit on the bus system.

21. The bus system of claim 20,
wherein the target is further configured to send additional read data to the initiator on the first data line and the second data line when the acknowledge/not acknowledge bit indicates an acknowledgement.

22. The bus system of claim 21,
wherein the target starts driving the first data line on a falling edge of a clock signal on the clock line during the first bus turnaround.

23. The bus system of claim 15,
wherein the stop indication includes a low signal for three clock cycles on the clock line and a high signal for a second clock cycle of the three clock cycles on the first data line.

24. The bus system of claim 15,
where the target is further configured to send a target bus request before sending, by the initiator, a start indication on the clock line and the first data line.

25. The bus system of claim 15,
wherein the first line and the second line have first pull down resistors at the initiator and the first and second lines have second pull down resistors at the target.

* * * * *